United States Patent Office 3,083,199
Patented Mar. 26, 1963

3,083,199
Δ³-5α-STEROIDS AND 3α-HYDROXY-5α-STEROIDS
AND THE PREPARATION THEREOF
Luciano Caglioti and Gianfranco Cainelli, Milan, Italy,
assignors to Società Farmaceutici Italia, Milan, Italy, a
corporation of Italy
No Drawing. Filed Jan 8, 1962, Ser. No. 165,279
Claims priority, application Italy Jan. 11, 1961
11 Claims. (Cl. 260—239.55)

Our invention relates to 5α-steroids and to a process of preparing such compounds from the corresponding 3-keto-Δ⁴-steroids by a hydroboration reaction. Δ³-5α-steroids and 3α-hydroxy-5α-steroids, rings A and B having the following structural formula:

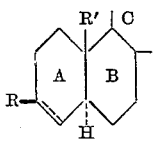

where R is α-hydroxy when a double bond is absent in the 3:4 position, and hydrogen when a double bond is present in the 3:4 position; where R' is hydrogen or methyl when a side chain is absent in the 17-position and methyl when a side chain is present in the 17-position and no double bonds are present in other parts of the steroid molecule, may be prepared according to the invention.

The products of the above general formula are useful both as intermediates for the synthesis of steroid products useful in therapy (in particular Δ³-5-α-steroids, from which, according to the invention, the corresponding 3α-hydroxy-5α-steroids may be prepared) and as physiologically active substances. Some of these products have hormonal activities as anabolics, androgenics, progestatives, corticoids, and natriuretics. Others have activity on the central nervous system, or are hypotensives or are antifungals.

The products of the invention can be prepared and administered in a wide variety of pharmaceutical units for oral and parenteral use, alone or in admixture with a solid or liquid pharmaceutically acceptable vehicle in which the compounds may be dissolved, dispersed or suspended. Solid compositions may be in the form of tablets, capsules, powders, or pills, while the liquid compositions may be in the form of solutions, emulsions, suspensions, syrups or elixirs. They may be administered topically as creams, ointments or lotions in the optional admixture with a therapeutically acceptable carrier or therapeutically active substances such as antibiotics or germicides. The products of the invention give neither toxic manifestations nor undesirable and dangerous collateral effects.

One of the most important products of this steroid class is the androsterone, the androgenic properties of which are well known (A. Butenandt et al.: Z. Angew. Chem. 44, 1931, p. 905). The literature methods for preparing Δ³-5α-steroids from 3-keto-Δ⁴-steroids such as the reduction according to Wolf-Kishner (G. Lardelli et al.: Helv. Chim. Acta 32, 1949, p. 1817) or the reduction with zinc and acetic acid (J. McKenna et al.: J. Chem. Soc. 1959, p. 2502) are both very expensive and delicate and give low yields (20–40%) of final product, owing to the formation of the 5beta-isomer and/or by-products. The literature processes for obtaining 3α-hydroxy-5α-steroids from 3-keto-Δ⁴-steroids such as the treatment with non-pyroforic Raney nickel (C. Djerassi et al.: J. Am. Chem. Soc. 77, 1955, p. 4925) always result in the formation of a mixture of 3α-hydroxy-5α-steroids and the corresponding stereosiomer in the 3-position, thereby causing difficult problems of separating such mixtures.

Our invention overcomes the above difficulties and provides a process of preparing a Δ³- or Δ³-19-nor-5α-steroid compound unsubstituted in the 3-position and having no double bonds in other parts of the steroid molecule wherein the corresponding 3-keto-Δ⁴-steroid compound is treated in solution and under a protective atmosphere with diborane, and the reaction product is dehydrated.

Our invention includes treating the dehydrated product of the paragraph just above with diborane and subsequently with alkaline hydrogen peroxide so as to yield the corresponding 3α-hydroxy or 3α-hydroxy-19-nor-5α-steroid compound.

The treatment with diborane is preferably carried out on an ethereal solution of the steroid compound. The process of the invention may be schematized as follows:

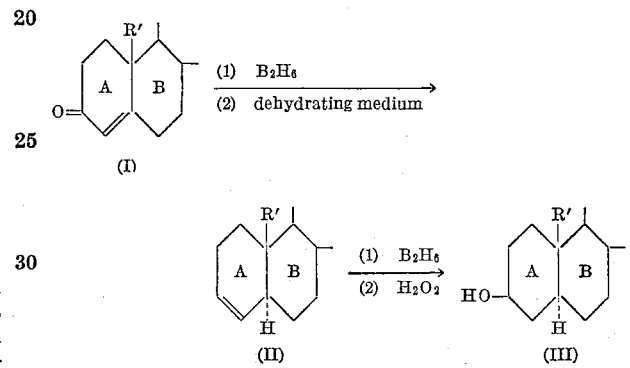

where R' has the significance indicated above. Δ³-5α-steroids and 3α-hydroxy-5α-steroids may be obtained from the corresponding 3-keto-Δ⁴-steroids in good yields (60–90% from I to II and from II to III) and with a simple and reproducible process on an industrial scale. In greater detail the process of the invention is as follows:

A 3-keto-Δ⁴-steroid (I), with no double bonds in the remainder of the molecule and with other keto groups, if present, blocked by a group which is easily removable by hydrolysis (preferably a ketalic, hemithioketalic or bismethylenedioxy group) is allowed to react with diborane preferably under nitrogen at atmospheric pressure, and at a temperature of from 0° to 100° C., such as at room temperature, and the reaction product is treated with an organic or inorganic acidic or basic dehydrating medium, preferably in the warm.

The resulting Δ³-5α-steroid (II) can be isolated and purified in known manner either by crystallization or by chromatographic separation, or it can be directly transformed into the 3α-hydroxy-5α-steroid (III) by further reaction with diborane in an ether, preferably under nitrogen at atmospheric pressure, and a temperature of from 0° to 100° C., preferably at room temperature, to yield a product (III). This product may be purified according to known isolation and purification procedures. The hydroboration reaction can be carried out by bubbling gaseous diborane into a solution of the steroid, by adding a diborane solution into an organic solvent, by adding the diborane in the form of a complex or by forming a diborane complex in situ, for example, by adding lithium and aluminum hydride and boron trifluoride (Ann. Rep. Chem. Soc. 1959, pp. 198 et seq.). Any ether such as ethyl ether or propyl ether or tetrahydrofuran or the dimethylether of diethyleneglycol and analogues thereof can be employed for either hydroboration reaction. In the step from I to II it is preferable to use diethyleneglycol dimethyl ether, which facilitates the subsequent reaction with the dehydrating medium.

Acetic anhydride, acetic acid, propionic acid, p.toluenesulphonic acid or potassium hydroxide are usually employed as dehydrating media, but acetic anhydride is preferred since it has been found to give high yields. Treatment with acetic anhydride causes the hydrolysis of the ketalic or hemithioketalic or bismethylenedioxy groups and the acetylation of hydroxy groups, if present.

Between the first transformation (I to II reaction) and the second (II to III reaction) one or more reactions may be carried out such as oxidation, esterification, ketalization or hydrolysis, according to the final product sought. Thus according to the invention, androsterone may be prepared by treating androst-4-ene-3-,17-dione-17-monoethyleneketal with diborane and subsequently with acetic anhydride, then by ketalizing in the 17-position the obtained 5α-androst-3-ene-17-one, and by allowing the resulting 5α-androst-3-ene-17-one ethyleneketal to react with diborane and subsequently with alkaline hydrogen peroxide; and 19-nor-androsterone may be prepared by treating 19-nor-androst-4-ene-17beta-ol-3-one with diborane and subsequently with acetic anhydride, by hydrolyzing the acetyl group of the 19-nor-5α-androst-3-ene-17beta-ol-acetate obtained, then by oxidizing the 17-hydroxy group to yield 19-nor-5α-androst-3-ene-17-one, which is finally ketalized in the 17-position and treated with diborane and alkaline hydrogen peroxide.

According to the present invention the known compounds, 5α-cholest-3-ene (G. Lardelli et al., Helv. Chim. Acta, 1949, 32, p. 1817), 5α-cholestane-3α-ol (Ruzicka, Helv. Chim. Acta, 1934, 17, p. 1407), 5α-androst-3-ene-17-one J. McKenna et al., J. Chem. Soc. 1959, p. 2502), androsterone (A. Butenandt et al., Z. Angew. Chem. 1931, 44, p. 905), 19-nor-androsterone (L. Englel et al., J. Biol. Chem., 1958, 231, p. 159), 5α-pregnane-3α,17α-diol-20-one (R. Neher et al., Helv. Chim. Acta, 1958, 41, p. 1667) and the new compounds 19-nor-5α-androst-3-ene-17beta-ol, 5α-pregn-3-ene-17beta-ol-20-one, 5α-pregn-3-ene-11beta,17α,21-triol-20-one, 5α-pregnane-3α, 11beta, 17α, 21-tetrol-20-one, 19-nor-5α-androst-3-ene-17beta-ol-acetate, 19-nor-5α-androst-3-ene-17-one, 19-nor-5α-androst-3-ene-17-one-ethyleneketal, 5α-pregn-3-ene-17α-ol-20-one-acetate, 5α-pregn-3-ene-17α-ol-20-one-ethyleneketal, 5α-pregn-3-ene-11beta-ol-17α,20,20,21-bis-methylenedioxy, and their derivatives by the process of the invention, where appropriate, have been prepared.

The following examples are to illustrate but not to limit the invention.

EXAMPLE 1

*5α-Cholest-3-Ene From Cholest-4-Ene-3-One*

A solution of 1 g. of cholest-4-ene-3-one in 20 cc. of diethyleneglycol dimethylether was treated with a great excess of diborane for an hour at room temperature and then left to stand for another forty minutes. 10 cc. of acetic anhydride were added to the solution which was then refluxed for an hour. All these operations were carried out under an atmosphere of anhydrous nitrogen. The reaction mixture, of dark brown color was evaporated under vacuum at 80° C., poured into water and extracted with ethyl ether. The ethereal extracts were washed with 10% sodium hydroxide and with water to neutrality and dried over sodium sulphate. Removal of the ethereal solvent yielded 1.060 g. of a brown viscous oil. By either recrystallization from aqueous methanol or chromatographic separation on alumina and successive elution with hexane, 5α-cholest-3-ene was obtained; melting point 73–74° C.; $[\alpha]_D^{22°}=+59.0°$ (c.=+1.01 in chloroform); yield 70%.

EXAMPLE 2

*5α-Cholestan-3α-Ol From 5α-Cholest-3-Ene*

A solution of 503 mg. of 5α-cholest-3-ene in 10 cc. of tetrahydrofuran was treated with an excess of diborane for an hour at room temperature and in an atmosphere of anhydrous nitrogen, and then left to stand for thirty minutes. The reaction mixture was then poured into 30 cc. of 5% methanolic potassium hydroxide; when gas development had ceased 3 cc. of 33% hydrogen peroxide were added. After about half an hour, the mixture was diluted with water and the whole was extracted with ether. The ethereal extracts were washed with a solution of ferrous sulphate and with water to neutrality, dried over sodium sulphate and evaporated to dryness.

The residue (545 mg.) was partially crystalline and was further purified chromatographically on an alumina column. With a 1:1 hexane-benzene mixture it was possible to elute 405 mg. of 5α-cholestane-3α-ol melting at 183–184° C. which, after being twice recrystallized from dilute aqueous methanol, melts at 185–186° C.; $[\alpha]_D^{22°}=+23°$ (c.=1.06 in chloroform).

EXAMPLE 3

*5α-Androst-3-Ene-17-One From Androst-4-Ene-3,17-Dione-17-Monoethyleneketal*

500 mg. of androst-4-ene-3,17-dione-17-monoethyleneketal (prepared as described in J. Amer. Soc., 1953, 75, p. 4425) dissolved in 20 cc. of diethyleneglycol-dimethyl-ether, were treated with a great excess of diborane and then with 10 cc. of acetic anhydride by operating exactly in the same conditions and with the same procedure described in Example 1 for the cholest-4-ene-3-one.

Thus 580 mg. of crude brown colored product were obtained.

Purification by crystallization from dilute aqueous methanol or by chromatographic separation on alumina and successive elution with benzene yielded 5α-androst-3-ene-17-one; melting point 125–126° C.; $[\alpha]_D^{22°}=+136$ (c.=1.08 in chloroform); yield: 62%.

EXAMPLE 4

*Androsterone From 5α-Androst-3-Ene-17-One-Ethyleneketal*

284 mg. of 5α-androst-3-ene-17-one-ethyleneketal (melting at 115–116° C. $[\alpha]_D^{22°}=+13°$ (c.=1.53 in chloroform) prepared by ketalizing 255 mg. of 5α-androst-3-ene-17-one with ethylene glycol and p.toluenesulphonic acid in boiling benzene in the usual manner, dissolved in 10 cc. of tetrahydrofuran were treated with a great excess of diborane and then oxidized with 30 cc. of alcoholic potassium hydroxide and 3 cc. of hydrogen peroxide operating under the same conditions and in the same manner as described in Example 2 for 5α-cholest-3-ene. Thus, about 300 mg. of a colorless oil were obtained, which was dissolved in 5 cc. of acetic acid and 5 cc. of water and heated on a water bath for an hour. Evaporation of the solvent under vacuum left a colorless non-crystalline residue weighing about 290 mg.

Recrystallization from a methylene dichlorideheptane mixture or by chromatographic separation on alumina and subsequent elution with benzene and a 3:1 benzene-ether mixture yielded androsterone; melting point 181–182° C.; $[\alpha]_D^{22°}=+97°$ (c.=1.20 in ethanol); yield: 50%.

EXAMPLE 5

*19-Nor-5α-Androst-3-Ene-17Beta-Ol From 19-Nor-Androst-4-Ene-17Beta-Ol-3-One*

3 g. of 19-nor-androst-4-ene-17beta-ol-3-one dissolved in 50 cc. of diethyleneglycol-dimethyl-ether were treated with a great excess of diborane and subsequently with 25 cc. of acetic anhydride, operating in exactly the same conditions and following the same procedure as described in Example 1 for cholest-4-ene-3-one.

About 3.3 g. of a crystalline dark-brown colored product were thus obtained from which by recrystallization or by chromatographic separation on alumina and subsequent recrystallization from dilute aqueous methanol 1.7 g. of product was obtained, which after two further recrystallizations from dilute aqueous methanol yielded 19-nor-5α-androst-3-ene-17beta-ol-acetate; melting point 115–116° C.; $[\alpha]_D^{22°}=-66.7°$ (c.=1.93 in chloroform).

By hydrolyzing the 19-nor-5α-androst-3-ene-17beta-ol-acetate with 5% methanolic potassium hydroxide at room temperature for 14 hours 19-nor-5α-androst-3-ene-17beta-ol was obtained; melting point 107–108° C.; $[\alpha]_D^{22°}=27.2°$ (c.=1.77 in chloroform); quantitative yield.

EXAMPLE 6

*19-Nor-Androsterone From 19-Nor-5α-Androst-3-Ene-17-One-Ethyleneketal*

The starting material, 19-nor-5α-androst-3-ene-17-one ethyleneketal, was prepared by oxidation of 19-nor-5α-androst-3-ene-17beta-ol with chromic acid in pyridine at room temperature in the known manner to 19-nor-5α-androst-3-ene-17-one; melting point 121–122° C.;

$$[\alpha]_D^{22°}=+53°$$

(c.=1.92 in chloroform), which in turn was ketalized with ethylene glycol and p.toluenesulphonic acid in boiling benzene by the technique of Example 4 to 19-nor-5α-androst-3-ene-17-one-ethyleneketal.

443 mg. of the crude starting material was dissolved in 15 cc. of tetrahydrofuran and treated for an hour at room temperature and in the atmosphere of anhydrous nitrogen with excess of diborane and then left to stand for thirty minutes. The reaction mixture was then slowly poured into 30 cc. of 5% methanolic potassium hydroxide and when gas development ceased, 3 cc. of 33% hydrogen peroxide were added. After about half an hour, the mixture was diluted with water and the whole was extracted with ethyl ether. The ethereal extracts were washed with a solution of ferrous sulphate and then with water to neutrality. They were dried over sodium sulphate and evaporated to dryness.

The residue was dissolved in 5 cc. of acetic acid and in 5 cc. of water, and heated for an hour at 30° C. 420 mg. of 19-nor-androsterone (melting point 158–159° C.) were obtained after the elimination of the solvent under vacuum. The product recrystallized from heptane melts at 162–163° C.; $[\alpha]_D^{22°}=+105°$ (c.=1.2 in chloroform).

EXAMPLE 7

*5α-Pregn-3-Ene-17α-Ol-20-One From Pregn-4-Ene-17α-Ol-3,20-Dione-20-Monoethyleneketal*

Pregn - 4 - ene-17α-ol-3,20-dione-20-monoethyleneketal (prepared as described in the U.S. Patent No. 2,648,662) in solution in ethyleneglycol dimethylether was treated with diborane and then with acetic anhydride in exactly the same conditions and by the same process as described in Example 1 for the cholest-4-ene-3-one. It was transformed into 5α-pregn-3-ene-17α - ol - 20-one - 17 - acetate (melting point 182–184° C.; $[\alpha]_D^{22°}=+90$, c.=1.2 in chloroform; yield 70%) which by hydrolysis in known manner with alkali gave 5α-pregn-3-ene-17α-ol-20-one.

EXAMPLE 8

*5α-Pregnane-3α,17α-Diol-20-One From 5α-Pregn-3-Ene-17α-Ol-20-One-Ethyleneketal*

5α - pregn-3-ene-17α-ol-20-one-ethyleneketal (prepared by ketalization of 5α-pregn-3-ene-17α-ol-20-one with ethylene glycol and p.toluenesulphonic acid in boiling benzene in the known manner) was reacted with diborane and then with alcoholic potassium hydroxide and hydrogen peroxide under the same conditions and following the same procedure as described in Example 2 for 5α-cholest-3-ene, and was transformed into 5α-pregnane-3α,17α-diol-20-one.

EXAMPLE 9

*5α-Pregn-3-Ene-11Beta,17α,21-Triol-20-One From Pregn-4 - Ene-11Beta-Ol-17α-20,20,21-Bismethylenedioxy-3-One*

Pregn - 4 - ene-11beta-ol,17α-20,20,21-bismethylenedioxy-3-one (prepared as described in U.S. Patents No. 2,888,456 and No. 2,888, 457) was treated with diborane and then with acetic anhydride as described in Example 1 for cholest-4-ene-3-one. By the hydrolysis and saponification of the resulting product 5α-pregn-3-ene-11beta,17α-21-triol-20-one was obtained.

EXAMPLE 10

*5α-Pregnane-3α,11Beta,17α,21-Tetrol-20-One From 5α-Pregn-3-Ene-11-Beta-Ol-17α,20,20,21-Bismethylenedioxy*

5α-pregn - 3 - ene - 11beta - ol - 17α,20,20,21-bismethylenedioxy (prepared in known manner from 5α-pregn-3-ene-11beta,17α,21-triol-20-one) was reacted with diborane and then with alcoholic potassium hydroxide and hydrogen peroxide under the same conditions, and by the same procedures as described in Example 2 for 5α-cholest-3-ene and hydrolysis in known manner was transformed into 5α-pregnane-3α,11beta,17α,21-tetrol-20-one.

We claim:
1. A process for preparing 5α-steroids, the A and B rings of said 5α-steroids having the formula:

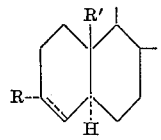

wherein R is a α-hydroxy when a double bond is absent in the 3:4-position and hydrogen when a double bond is present in the 3:4-position; R' is selected from the group consisting of hydrogen and methyl when a side chain is absent from the 17-position and R' is methyl when a side chain is present in the 17-position, and double bonds are absent from other parts of the steroid molecule, which comprises treating a 3-keto-Δ⁴-steroid free of other double bonds in the rest of the molecule and free of other unprotected ketone groups, in etheral solution and under a protective atmosphere with diborane and dehydrating the reaction product.

2. A process for preparing a compound selected from the group consisting of Δ³- and Δ³-19-nor-5α-steroids unsubstituted in the 3-position and lacking double bonds in other parts of the steroid molecule, which comprises treating a 3-keto-Δ⁴-steroid free of other double bonds in the rest of the molecule and free of other unprotected ketone groups, in etheral solution and under a protective atmosphere with diborane and dehydrating the reaction product.

3. A process for preparing a compound selected from the group consisting of 3α-hydroxy- and 3α-hydroxy-19-nor-5α-steroids unsubstituted in the 3-position and lacking double bonds in other parts of the steroid molecule, which comprises treating a 3-keto-Δ⁴-steroid free of other double bonds in the rest of the molecule and free of other unprotected ketone groups, in etheral solution and under a protective atmosphere with diborane, dehydrating the reaction product, and treating the resulting Δ³-5α-steroid in ethanol solution and under a protective atmosphere with diborane and subsequently with alkaline hydrogen peroxide.

4. A process for preparing a compound selected from the group consisting of 3α-hydroxy- and 3α-hydroxy-19-nor-5α-steroids unsubstituted in the 3-position and lacking double bonds in other parts of the steroid molecule, which comprises treating a 3-keto-Δ⁴-steroid free of other double bonds in the rest of the molecule and free of other unprotected ketone groups, in diethyleneglycol dimethyl ether solution under a protective with diborane, dehydrating with acetic anhydride, and treating the resulting Δ³-5α-steroid in diethyleneglycol dimethyl ether solution under a protective atmosphere with diborane followed by alkaline hydrogen peroxide.

5. A process for preparing a compound selected from the group consisting of 3α-hydroxy- and 3α-hydroxy-19-nor-5α-steroids unsubstituted in the 3-position and free of double bonds in other parts of the molecule, which comprises treating a compound selected from the group consisting of the corresponding Δ³ and Δ³-19-nor-5α-steroids in diethyleneglycol dimethyl ether solution under a protective atmosphere with diborane followed by alkaline hydrogen peroxide.

6. 5α-pregn-3-ene-17α-ol-20-one.
7. 5α-pregn-3-ene-17α-ol-20-one acetate.
8. 5α-pregn-3-ene-17α-ol-20-one-ethyleneketal.
9. 5α-pregn-3-ene-11beta,17α,21-triol-20-one.
10. 5α - pregn-3-ene-11beta-ol-17α,20,20,21-bismethylenedioxy.
11. 5α-pregnane-3α,11beta-17α,21-tetrol-20-one.

References Cited in the file of this patent

McKenna et al.: J. Chem. Soc. 1959, pages 2502–2509.